(12) United States Patent
Nezu (10) Patent No.: US 9,127,797 B2
(45) Date of Patent: Sep. 8, 2015

(54) CONNECTOR

(75) Inventor: Mikio Nezu, Fujisawa (JP)

(73) Assignee: NIFCO INC., Yokohama-Shi, Kanagawa (JP)

( * ) Notice: Subject to any disclaimer, the term of this patent is extended or adjusted under 35 U.S.C. 154(b) by 626 days.

(21) Appl. No.: 13/504,724

(22) PCT Filed: Oct. 18, 2010

(86) PCT No.: PCT/JP2010/006161
§ 371 (c)(1),
(2), (4) Date: May 18, 2012

(87) PCT Pub. No.: WO2011/052153
PCT Pub. Date: May 5, 2011

(65) Prior Publication Data
US 2012/0242080 A1    Sep. 27, 2012

(30) Foreign Application Priority Data
Oct. 28, 2009   (JP) .................................. 2009-247630

(51) Int. Cl.
*F16L 35/00*   (2006.01)
*F16L 37/084*   (2006.01)

(52) U.S. Cl.
CPC .......... *F16L 37/0841* (2013.01); *F16L 2201/10* (2013.01)

(58) Field of Classification Search
CPC .......................... F16L 2201/10; F16L 37/0841
USPC .................................... 285/93, 319, 308, 317
See application file for complete search history.

(56) References Cited

U.S. PATENT DOCUMENTS

| | | | | |
|---|---|---|---|---|
| 4,875,715 A | * | 10/1989 | Dennany et al. | 285/87 |
| 6,386,596 B1 | * | 5/2002 | Olson | 285/321 |
| 2007/0236012 A1 | * | 10/2007 | Kerin et al. | 285/308 |

FOREIGN PATENT DOCUMENTS

| | | |
|---|---|---|
| JP | 2006-316944 A | 11/2006 |
| JP | 2007-255668 A | 10/2007 |
| KR | 10-2003-0095265 A | 12/2003 |
| KR | 10-2009-0051501 A | 5/2009 |
| KR | 10-2009-0067051 A | 6/2009 |
| WO | WO 2009/078179 A1 | 6/2009 |
| WO | WO 2009/119058 A1 | 10/2009 |

OTHER PUBLICATIONS

Korea Patent Office, "Office action for KR 10-2012-7003632," Nov. 25, 2013.

* cited by examiner

*Primary Examiner* — Michael P Ferguson
*Assistant Examiner* — Jay R Ripley
(74) *Attorney, Agent, or Firm* — Manabu Kanesaka (57) ABSTRACT

A connector with a connection verifying mechanism is made with a relatively small number of components, and to reduce movement of a locking member that undetachably fixes a counterpart for size reduction. The connector (1) includes a housing (3) having an insertion hole (4) into which a pipe (2) is inserted, a locking member (5) that is attached to the housing and driven from an initial position to a locked position by the pipe to undetachably fix the pipe at the locked position and an identifying member (6) that is provided in the housing and has display pieces (74, 74) that differ from the locking member in color, and the locking member shield the display pieces at the initial position and exposes the display pieces at the locked position.

7 Claims, 8 Drawing Sheets

CONNECTOR

RELATED APPLICATIONS

The present application is National Phase of International Application No. PCT/JP2010/006161 filed Oct. 18, 2010, and claims priority from Japanese Application No. 2009-247630, filed Oct. 28, 2009.

TECHNICAL FIELD

The present invention relates to a connector that can verify completion of connection between the connector and a counterpart.

BACKGROUND ART

As a conventional connector provided with a connection verifying mechanism that allows the user to verify completion of connection between the connector and a counterpart, there is known a connector including a connector housing and a retainer (locking member) that is projectably and depressably fitted into the connector housing and prevents a pipe body (counterpart) inserted into the connector housing from escaping from the housing, wherein the retainer is located at protruded position from the connector housing in an initial state and is engaged with an annular engaging protruding part of the pipe body when the pipe body is inserted into the connector housing, thereby moving to a depressed position (refer to Patent document 1). The retainer has a pair of legs extended outward due to engagement with the annular engaging protruding part of the pipe body, and a spring deformed with the displacement of the legs, thereby generating a spring force to bias a body of the retainer toward the depressed position.

With the conventional connector, advantageously, the user can recognize whether or not connection between the connector and the counterpart is completed on the basis of the position of the retainer (that is, whether the retainer is located at the protruded position or the depressed position), and can realize the connection verifying mechanism having a relatively small number of components.

PRIOR ART DOCUMENT

Patent Document

Patent Document 1: Japanese Patent Publication No. 2006-316944

DISCLOSURE OF THE INVENTION

Problems to be Solved by the Invention

According to the above-mentioned conventional art, in order to allow the user to verify completion of connection more easily and clearly, it is needed to ensure a displacement of the retainer between the protruded position and the depressed position as much as possible. However, such increase in the displacement of the retainer disadvantageously leads to an increase in the size of the connector as well as an increase in an insertion resistance of the pipe body with respect to the connector.

Moreover, according to the above-mentioned conventional art, since the retainer is moved by urging of the spring, when the urging force of the spring decreases due to aged deterioration and the like, disadvantageously, the user cannot normally verify the connection.

The present invention is made in consideration of the problems of the conventional art and a main object of the present invention is to provide a compact connector in which the connection verifying mechanism is configured of the relatively small number of components and movement of the locking member that undetachably fixes the counterpart inserted into the connector housing is small.

Means of Solving the Problem

In order to solve the above-mentioned problems, according to a first aspect of the present invention, a connector (1) that can verify a connection state between the connector (1) and a counterpart (2), includes a housing (3) having an insertion hole (4) into which the counterpart is inserted, a locking member (5) that is attached to the housing and driven from an initial position to a locked position by the counterpart inserted into the insertion hole to undetachably fix the counterpart at the locked position and an identifying member (6) that is provided in the housing and has a connection completion display part (74) which differs from the locking member in color. The locking member shields the connection completion display part at the initial position, and exposes the connection completion display part at the locked position.

According to a second aspect of the present invention, the locking member may protrude outward from the outer shape of the housing at the initial position, and be housed so as to be flush with or inner from the outer shape of the housing at the locked position.

According to a third aspect of the present invention, the locking member may protrude outward from the outer shape of the housing at the initial position, and the amount of protrusion may change at the locked position.

According to a fourth aspect of the present invention, the locking member may protrude from a predetermined portion of the housing at the initial position, and may protrude from a portion that is different from the predetermined portion of the housing at the locked position.

According to a fifth aspect of the present invention, the locking member may include an engaged part (43) that is engageable with the housing, and the engaged part is not engaged with the housing when the locking member is located at the initial position, and is engaged with the housing when the locking member is located at the locked position.

According to a sixth aspect of the present invention, the housing may include an engaging part (24) that engages an engaged part of the locking member, and when the locking member moves from the initial position to the locked position, the engaged part may be moved from one unengaged position to the other engaged position of the engaging part across the engaging part by elastic deformation of the locking member.

According to a seventh aspect of the present invention, the housing may include a first display opening (23) that exposes the connection completion display part, and the locking member may include a second display opening (61) that does not overlap the first display opening at the initial position and overlaps the first display opening at the locked position.

According to an eighth aspect of the present invention, a connector (1) that can verify a connection state between the connector (1) and a counterpart (2), includes a housing (3) having an insertion hole (4) into which the counterpart is inserted, a locking member (5) that is attached to the housing and driven from an initial position to a locked position by the counterpart inserted into the insertion hole to undetachably fix the counterpart at the locked position and an identifying member (6) that is provided in the housing and has a connection completion display part (74) which differs from the locking member in color. The locking member exposes the connection completion display part at the initial position, and shields the connection completion display part at the locked position.

Effects of the Invention

According to the first and eighth aspects of the present invention, the locking member driven from the initial position to the locked position by the counterpart and the identifying member having the connection completion display part that differs from the locking member in color are provided, and the connection completion display part is shielded (or exposed) by the locking member located at the initial position and exposed (or shielded) when the locking member moves to the locked position. Therefore, advantageously, the connection verifying mechanism can be configured of the relatively small number of components and furthermore, the compact connector with a small movement of the locking member can be realized.

According to the second aspect of the present invention, the user can more reliably verify the connected state on the basis of the shielded state or the exposed state of the connection completion display part of the identifying member and the protruded state or the housed state of the locking member.

According to the third aspect of the present invention, the user can more reliably verify the connected state on the basis of the shielded state or the exposed state of the connection completion display part of the identifying member and change of the amount of protrusion of the locking member.

According to the fourth aspect of the present invention, the user can more reliably verify the connected state on the basis of the shielded state or the exposed state of the connection completion display part of the identifying member and change of the protruded position of the locking member.

According to the fifth aspect of the present invention, the locking member can be held at the locked position, thereby preventing detachment of the counterpart.

According to the sixth aspect of the present invention, with the simple configuration, the locking member can be stably held at the locked position.

According to the seventh aspect of the present invention, with the simple configuration, the connection completion display part can be shielded or exposed according to the position of the locking member.

BRIEF DESCRIPTION OF THE DRAWINGS

FIG. 1 (A) is a perspective view showing a connector in an unconnected state and FIG. 1 (B) is a perspective view showing the connector in a connection completed state in accordance with the first embodiment.

FIG. 3 (A) is a perspective view when viewed from front side and FIG. 3 (B) is a back view of a locking member.

FIG. 11 (A) is a view showing the connector in the unconnected state and the FIG. 11 (B) is a view showing the connector in the connection completed state in accordance with the second embodiment.

EMBODIMENTS OF THE INVENTION

First Embodiment

A connector in accordance with the first embodiment of the present invention will be described with reference to FIG. 1 to FIG. 8. In following description, terms defining directions shall follow directions shown in FIG. 1.

Figure 1A:
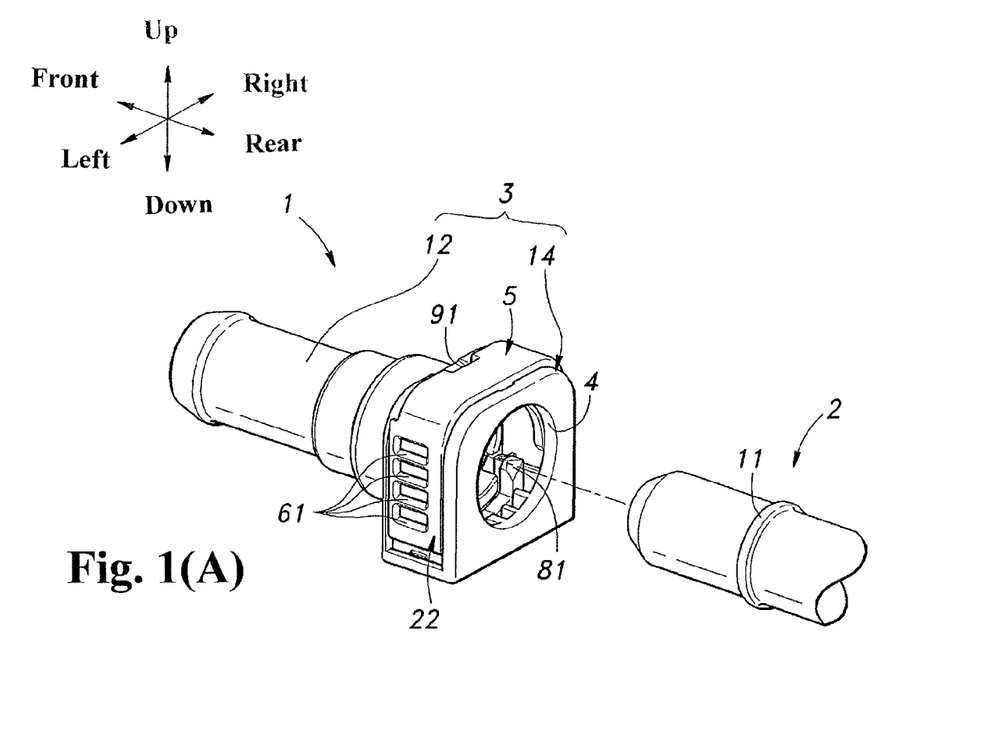
Figure 1B:
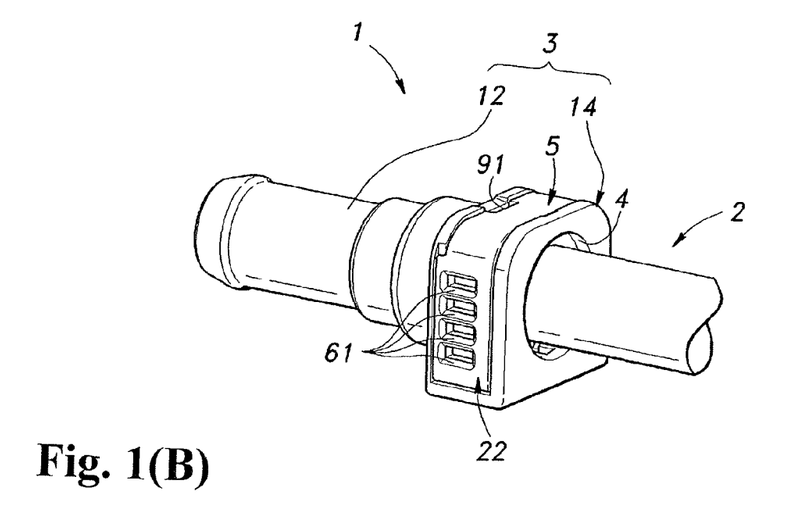
Figure 2:
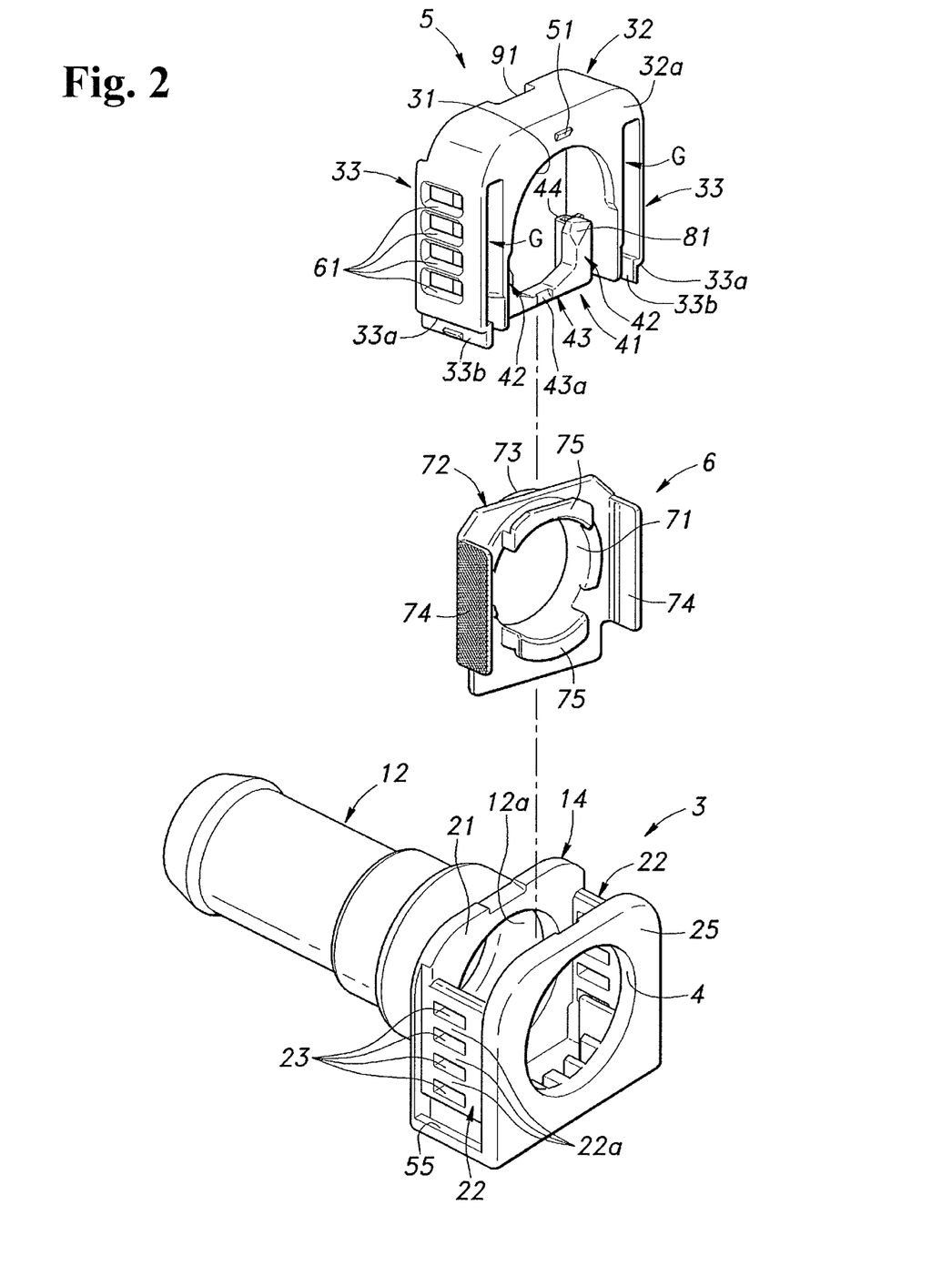
FIG. 2 is an exploded perspective view of the connector in accordance with the first embodiment.

As shown in FIG. 1 and FIG. 2, the connector 1 is connected to a pipe 2 that transports a fluid, and mainly includes a housing 3 as a main body, a locking member 5 that undetachably fixes the pipe 2 inserted into an insertion hole 4 of the housing 3, and an identifying member 6 that displays a connection state between the pipe 2 and the housing 3 so as to be visually verified by the user. The members 3, 5, and 6 constituting the connector 1 each are made of a synthetic resin material and are bilaterally symmetrical.

The pipe 2 is made of metal or synthetic resin, and an annular flange part 11 used for connection with the connector 1 is protrudingly provided on an outer circumferential surface of the pipe 2 on its front end side. When connecting with or releasing from the connector 1, the pipe 2 moves back and forth with respect to the connector 1.

Figure 4:
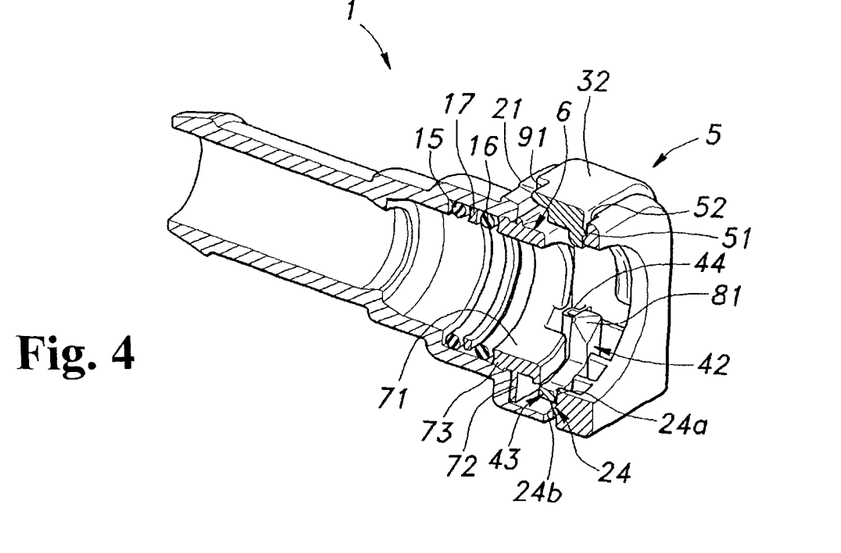
FIG. 4 is a perspective sectional view of the connector in the unconnected state in accordance with the first embodiment.

The housing 3 includes a tubular joint part 12 at its front end, to which other pipes not shown can be connected, and an insertion part 14 that communicates with a rear end of the joint part 12 and in which the insertion hole 4 of the pipe 2 is formed. The joint part 12 is tapered toward its front end in a stepped manner and as shown in FIG. 4, O rings 15, 16 for sealing a flow path are attached to an inner wall of a rear part of the joint part 12 through an annular bush 17.

As shown in FIG. 2, an upper opening 21 into which the locking member 5 is inserted is formed in an upper portion of the insertion part 14. A plurality of (here, four) display openings 23 are formed in right and left walls 22, 22 of the insertion part 14 so as to be arranged at regular intervals in the vertical direction and pass through in the horizontal direction. On the right and left walls 22, 22, a width of a gap 22a located between the adjacent display openings 23 in the vertical direction (moving direction of the locking member 5) is set to be equal to the width of each display opening 23. An engaging claw 24 that engages a below-mentioned engaged part 43 of the locking member 5 is provided on a lower front surface located below the insertion hole 4, on a rear wall 25 of the insertion part 14 so as to protrude forward (refer to FIG. 4).

The locking member 5 is attached to the housing 3 so as to be vertically movable in the upper opening 21 and as shown in FIG. 3, includes an annular body part 32 in which an insertion hole 31 of the pipe 2 is formed and a pair of right and left arms 33, 33 that extend downward from an upper portion of the body part 32 along right and left side surfaces, respectively.

Figure 3A:
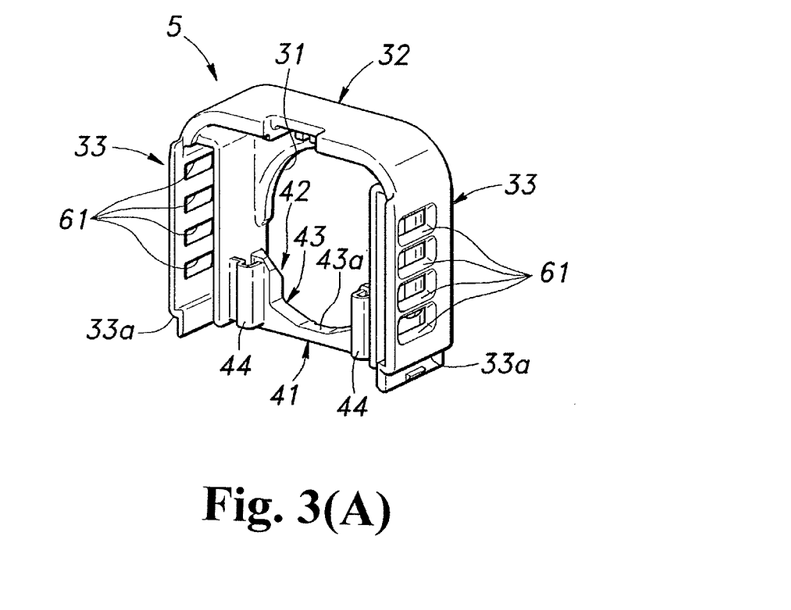

As shown in FIG. 2, the body part 32 is arranged ahead of a rear wall 32a, and includes an elastic lock piece 41 that defines a bottom of the insertion hole 31 of the pipe 2. The elastic lock piece 41 is substantially U-like and includes a pair of vertically extending right and left pipe contact parts 42, 42 and the engaged part 43 that couples lower ends of the pipe contact parts 42, 42 to each other. As shown in FIG. 3(A), the pipe contact parts 42, 42 are connected to inner surfaces of right and left side walls of the body part 32 through bent parts 44, 44 that can be easily bent, respectively, so that the pipe contact parts 42, 42 can be displaced back and forth (inserting/detaching direction of the pipe 2) together with the engaged part 43. The engaged part 43 is formed such that a thickness of a center part 43a is smaller than a thickness of right and left side parts when viewed in the back-forth direction.

Figure 3B:
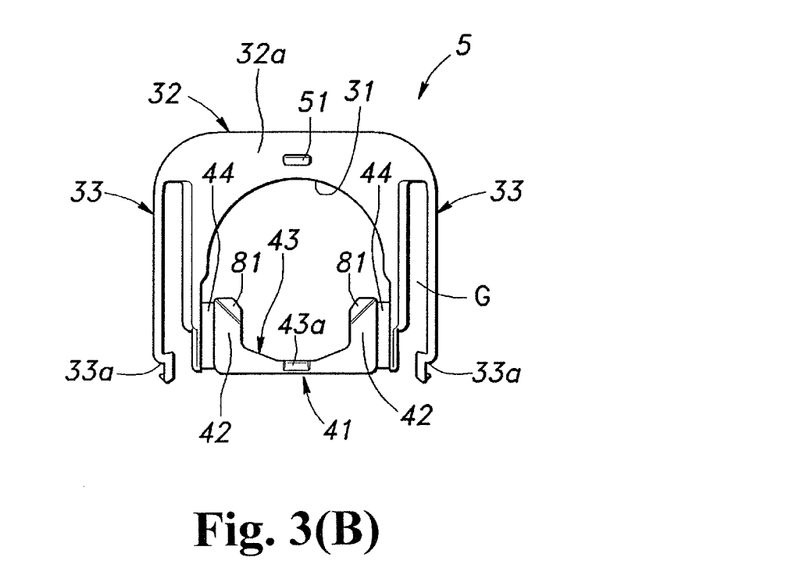

As shown in FIG. 3(B), the rear wall 32a of the body part 32 is cut substantially in the shape of a semicircular arc protruding upward to define a top of the insertion hole 31 of the pipe 2. The rear wall 32a of the body part 32 also has a guide protrusion 51 that protrudes rearward. The guide protrusion 51 is slidably held in a vertical groove 52 formed in a rear wall of the insertion part 14 of the housing 3 (refer to FIG. 4), thereby guiding vertical movement of the locking member 5.

The arms 33, 33 each have a stepped part 33a formed by curving a bottom of each arm inwardly. The stepped parts 33a are held in recessed parts 55 (refer to FIG. 2) provided in the right and left walls 22, 22 of the housing 3 when the locking member 5 is attached to the housing 3. Thereby, detachment of the locking member 5 from the housing is prevented.

Display openings 61 having the substantially same configuration as the display openings 23 in the right and left walls 22, 22 of the housing 3 are formed in each of the arms 33, 33. The plurality of (here, four) display openings 61 are formed in the arms 33, 33 so as to be vertically arranged at predetermined intervals. A width of a gap 33a located between the adjacent display openings 61 in the arms 33, 33 in the vertical direction (moving direction of the locking member 5) is set to be equal to a width of each display opening 61.

The identifying member 6 mainly includes, as shown in FIG. 2, an annular body part 72 in which an insertion hole 71 for the pipe 2 is formed, an annular convex part 73 provided so as to protrude from a front surface of the body part 72, a pair of display pieces 74, 74 extending rearward from right and left side edges of the body part 72 and a plurality of circular arc pipe restricting parts 75 provided so as to protrude from a back surface of the body part 72. The identifying member 6 is attached to the housing 3 by fitting the annular convex part 73 into an opening 12a of the joint part 12 of the housing 3.

In the identifying member 6, to display completion of connection with the pipe 2, at least the display pieces 74, 74 have a color that is different from a color of the locking member 5 (at least, the surfaces of the arms 33, 33, in which the display openings 61 are formed). For example, when an outer surface of the locking member 5 is black, the display pieces 74, 74 may be highly visible red. The display pieces 74, are inserted into gaps G between left and right side surfaces of the body part 32 of the locking member 5 and the arms 33, 33 (refer to FIG. 3(B)), respectively, and are arranged inner of the right and left walls 22, 22 of the housing 3 so as to face the walls. Accordingly, in the state where the locking member 5 is not attached to the housing 3, the display pieces 74, 74 are exposed from the display openings 23 of the housing 3.

Next, details of the connecting operation of the connector 1 and the pipe 2 with the above-mentioned configuration will be described.

As shown in FIG. 4, in the connector 1 in an unconnected state (that is, prior to connection with the pipe 2), the locking member 5 is located at a raised position (initial position) where the top of the body part 32 protrudes from the upper opening 21 of the housing 3. At this time, the stepped parts 33a of the locking member 5 (refer to FIG. 3(B)) contact with upper surfaces of the recessed parts 55 of the housing 3 (refer to FIG. 2), thereby being prevented from moving upward. Further, at this time, the engaged part 43 of the elastic lock piece 41 of the locking member 5 is located at an unengaged position, and the center part 43a (refer to FIG. 2) contacts with an upper surface 24a of the engaging claw 24 of the housing. Thereby, the locking member 5 is also restricted from moving downward.

When the locking member 5 is located at the raised position, each of the display openings 61 in the arms 33, 33 is shifted upward with respect to each of the display openings 23 of the housing 3 located inner from the locking member 5 by the width of one display opening 23. Thus, each gap 22a located between the adjacent display openings 23 is exposed from the display opening 61. Each gap 22a is formed so as to have the same color as the locking member 5 (at least the surfaces of the arms 33, 33, in which the display openings 61 are formed), so that the user recognizes that nothing is displayed in the display openings 61 (that is, the connector 1 is in the unconnected state).

Figure 5:
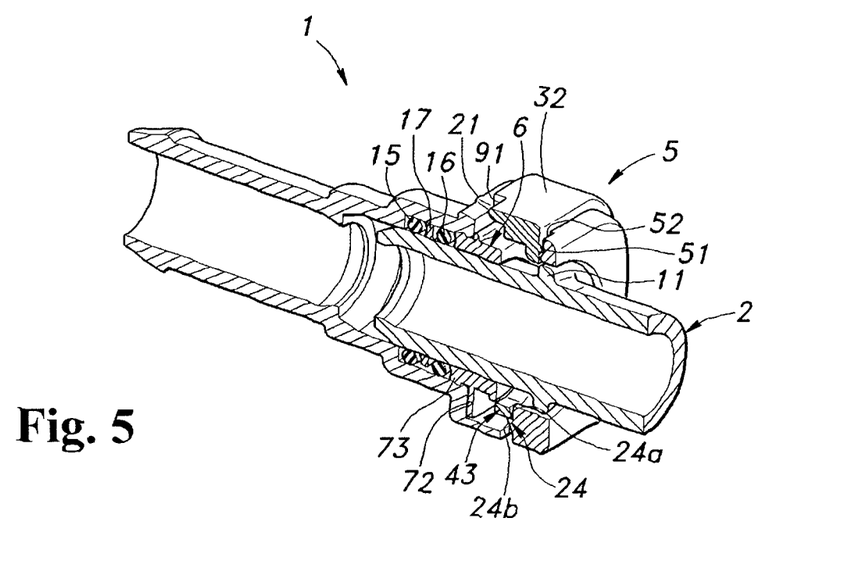
FIG. 5 is a perspective sectional view of the connector being connected in accordance with the first embodiment.

When the user inserts the pipe 2 into the insertion hole of the housing 3, an outer circumferential surface of the pipe 2 is in sliding contact with the insertion hole 71 of the identifying member 6 and an inner circumferential surface of the bush 17, thereby guiding insertion of the pipe 2. As shown in FIG. 5, during insertion of the pipe 2 into the housing 3, the flange part 11 of the pipe 2 contacts pipe contact parts 42 of the elastic lock piece 41 of the locking member 5 (refer to FIG. 4). Describing in more detail, a contact surface 81 (refer to FIG. 4) is formed on the top of each pipe contact part 42 by obliquely cutting a rear inner side of the pipe contact part 42, and the flange part 11 of the pipe 2 contacts the contact surfaces 81.

Figure 6:
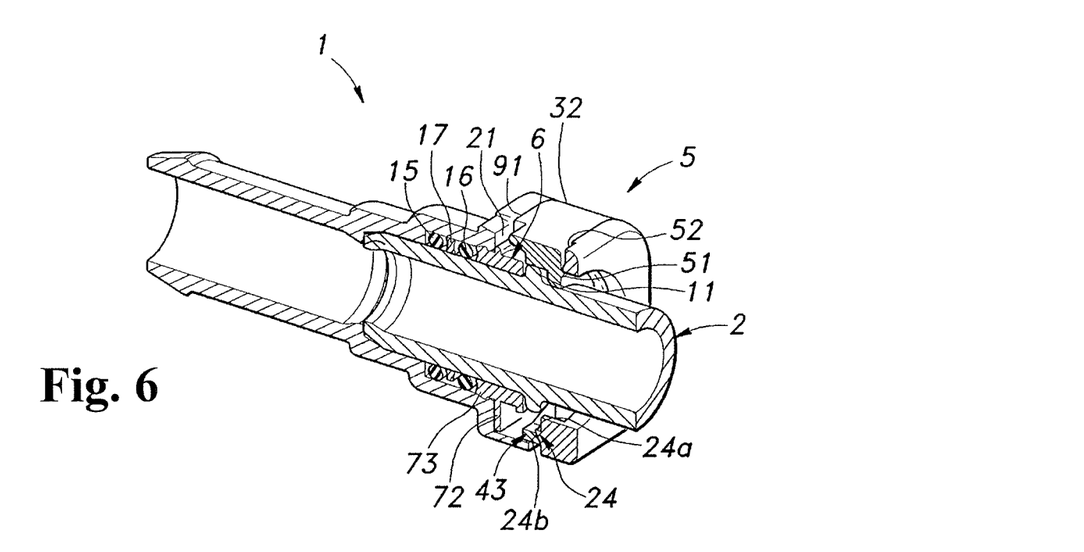
FIG. 6 is a perspective sectional view of the connector in the connection completed state in accordance with the first embodiment.
Figure 7:
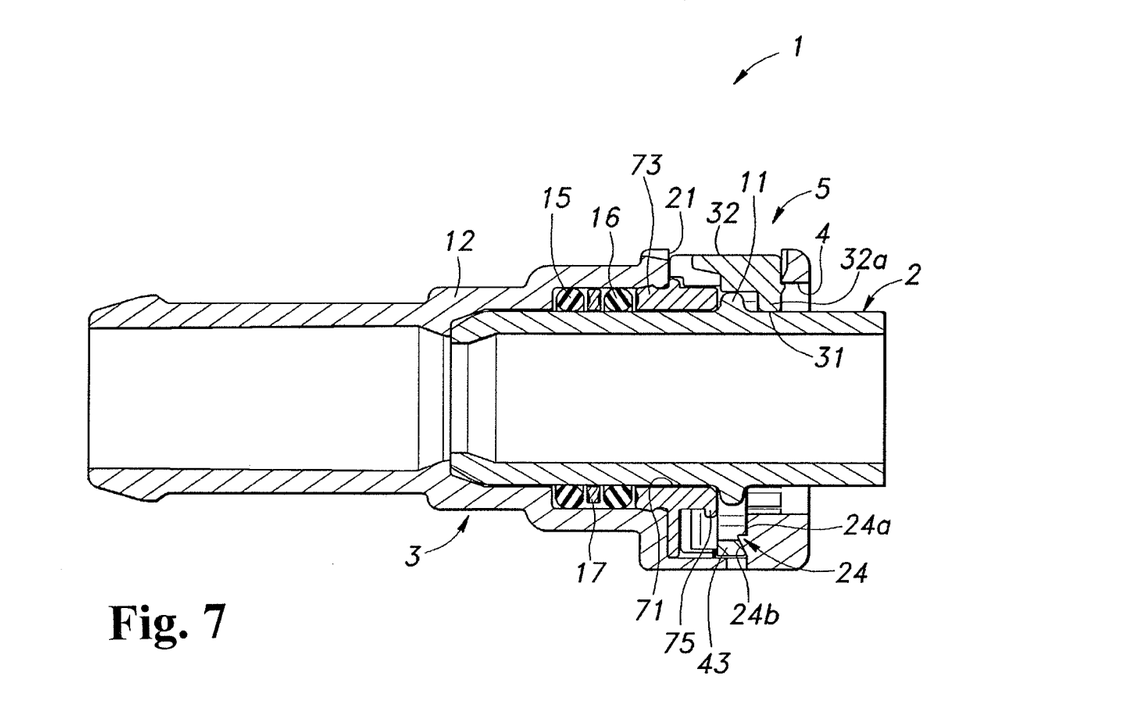
FIG. 7 is a sectional view of the connector in the connection completed state in accordance with the first embodiment.

When the user further pushes the pipe 2 forward from the state shown in FIG. 5, the flange part 11 moving forward presses the contact surfaces 81, thereby applying a force to move the locking member 5 downward as well as a force to elastically deform the bent parts 44 (refer to FIG. 4) to displace the elastic lock piece (engaged part 43) forward, to the locking member 5. As a result, as shown in FIG. 6 and FIG. 7, the engaged part 43 of the elastic lock piece 41 moves over the engaging claw 24 to an engaged position, and contacts a lower inclined surface 24b of the engaging claw 24. Thus, the locking member 5 is restricted from moving upward and is stably held at a lowered position.

At this time, the locking member 5 is located at the lowered position (locked position) where the body part 32 is housed in the upper opening 21 of the housing 3. As shown in FIG. 7, the flange part 11 of the pipe 2 is sandwiched between the rear wall 32a of the body part 32 of the locking member 5 and the pipe restricting parts 75 of the identifying member 6. Further, at this time, each of the display openings 61 in the arms 33, 33 overlaps each of the display openings 23 of the inner housing 3. Here, the movement of the locking member 5 from the raised position to the lowered position is set to the width of one display opening 23. Thus, a part of the display pieces 74, 74 of the identifying member 6 is exposed through the display openings 23 and the display openings 61 and the user recognizes that completion of connection is displayed in the display openings 61 (that is, the connector 1 is in the completely connected state). In this manner, connection between the connector 1 and the pipe 2 is completed.

A notched part 91 is formed in a front edge of an upper wall of the body part 32 of the locking member 5. The user can insert a predetermined tool into the notched part 91, thereby applying an upward force to the locking member 5. Thereby, the engaged part 43 of the locking member 5 is elastically deformed along the lower inclined surface 24b of the engaging claw 24, resulting in that engagement by the engaging claw 24 of the housing is released and the locking member moves to the raised position shown in FIG. 4 again.

The connector 1 includes the locking member 5 driven from the raised position to the lowered position by the pipe 2 and the identifying member 6 having the display pieces 74, 74 that differ from the locking member 5 in color, and the display pieces 74, 74 are shielded by the locking member 5 at the initial position and exposed when the locking member 5 moves to the lowered position. Therefore, the connection verifying mechanism can be configured by a relatively small number of components and furthermore, the compact configuration having the small movement of the locking member 5 can be realized. In this case, the user can advantageously verify the connection state of the connector 1 on the basis of change of the color in the display openings 61 rather than change of the position of the locking member 5.

As a modified example of the connection completion display method, it may be configured that, by changing arrangement of the display openings 23, 61, the display pieces 74, 74 are exposed by the locking member 5 located at the initial position, and shielded when the locking member 5 moves to the lowered position. Further, the identifying member 6 is not necessarily provided as an independent member and for example, may be formed integrally with the housing 3. The display pieces 74, 74 are not limited to the above-mentioned configuration that differs from the locking member 5 in color and for example, may display the user-recognizable character, sign, figure or the like in the display openings 23, 61.

In the connector 1, the locking member 5 protrudes outward from the outer shape of the housing 3 at the raised position and is housed so as to be flush with or inner from the outer shape of the housing 3 at the lowered position. Therefore, the user can verify the connection state on the basis of the shielded state or the exposed state of the display pieces 74, 74 of the identifying member 6 and the protruded state or the housed state of the locking member 5 more reliably. In this case, the user can advantageously verify the protruded state or the housed state of the locking member 5 through the sense of touch of a finger or the like rather than visual inspection.

Figure 8A:
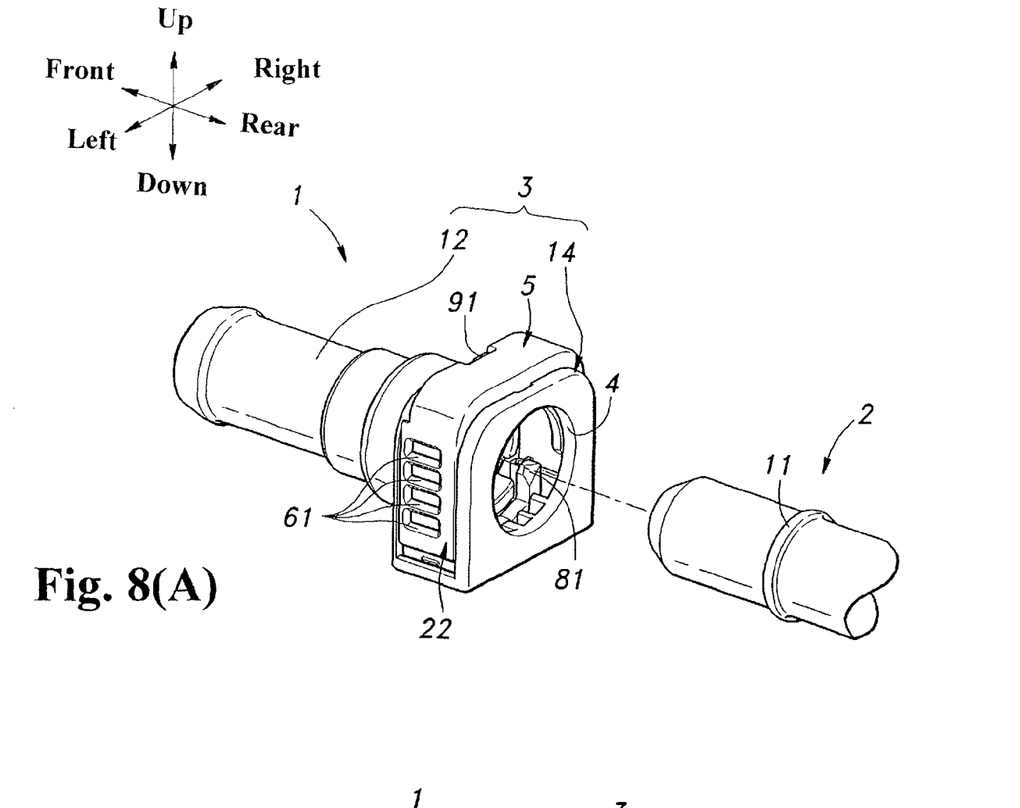
FIG. 8 is a perspective view showing a modified example of the connector in accordance with the first embodiment.
Figure 8B:
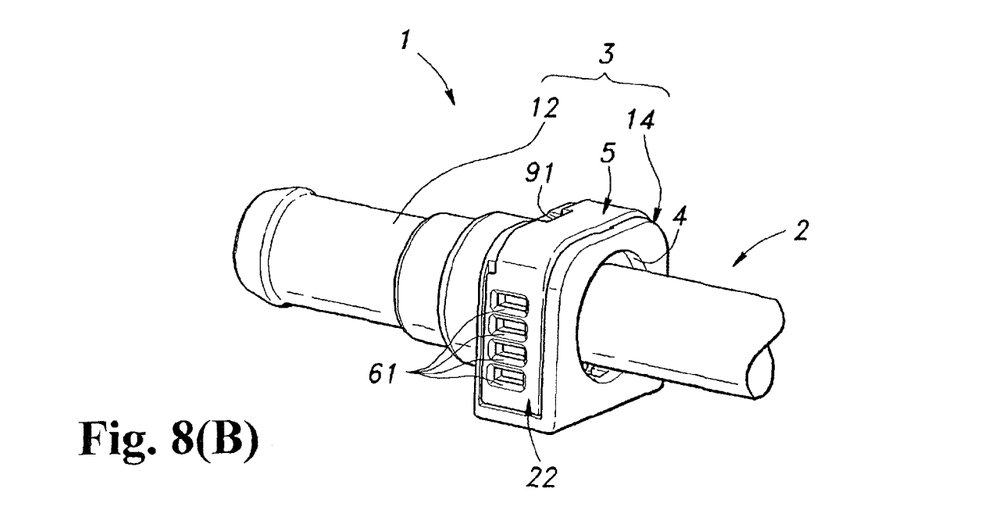

As a modified example of the first embodiment, as shown in FIG. 8, the locking member 5 protrudes outwardly from the outer shape of the housing 3 at the raised position, and the amount of protrusion may be changed at the lowered position (that is, the locking member 5 is not wholly housed in the housing). Although the amount of protrusion of the locking member 5 decreases in the connected state of the connector 1 in FIG. 8(B) as compared to the unconnected state of the connector in FIG. 8(A), conversely, the amount of protrusion may increase when connecting the connector 1.

With the configuration in this modified example, the user can verify more reliably the connected state on the basis of the shielded state or the exposed state of the display pieces 74, 74 of the identifying member 6 and change of the amount of protrusion of the locking member 5. In this case, the user can advantageously verify the amount of protrusion of the locking member 5 through the sense of touching by a finger or the like rather than visual inspection.

Second Embodiment

Next, a connector in accordance with the second embodiment of the present invention will be described with reference to FIG. 9 to FIG. 11. In the second embodiment, the same constituents as those in the first embodiment are not shown or are given the same reference numerals, and configurations and functions thereof are the same as those in the first embodiment except for below-mentioned matters.

Figure 9:
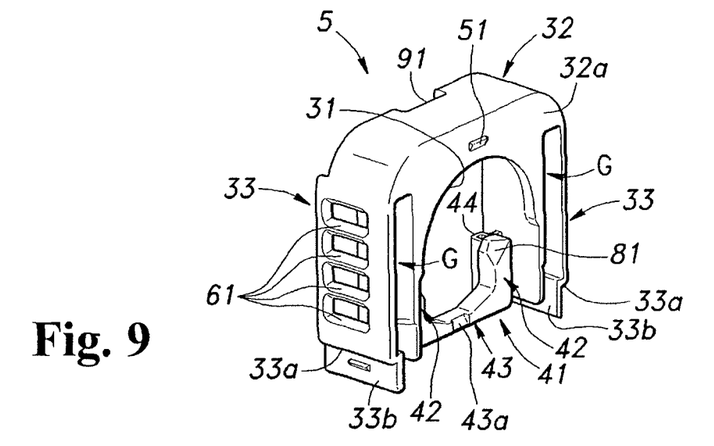
FIG. 9 is a perspective view of a locking member of a connector in accordance with the second embodiment.
Figure 10:
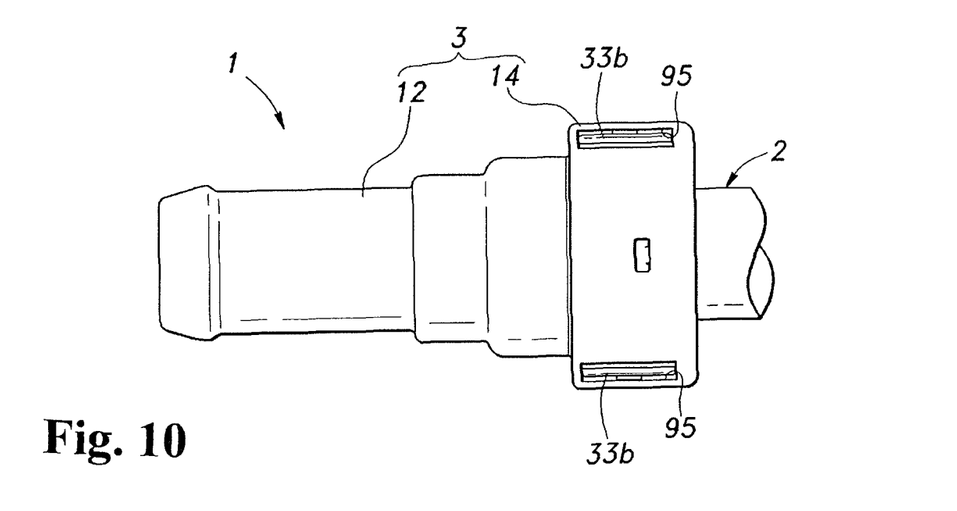
FIG. 10 is a bottom view of the connector in accordance with the second embodiment.
Figure 11A:
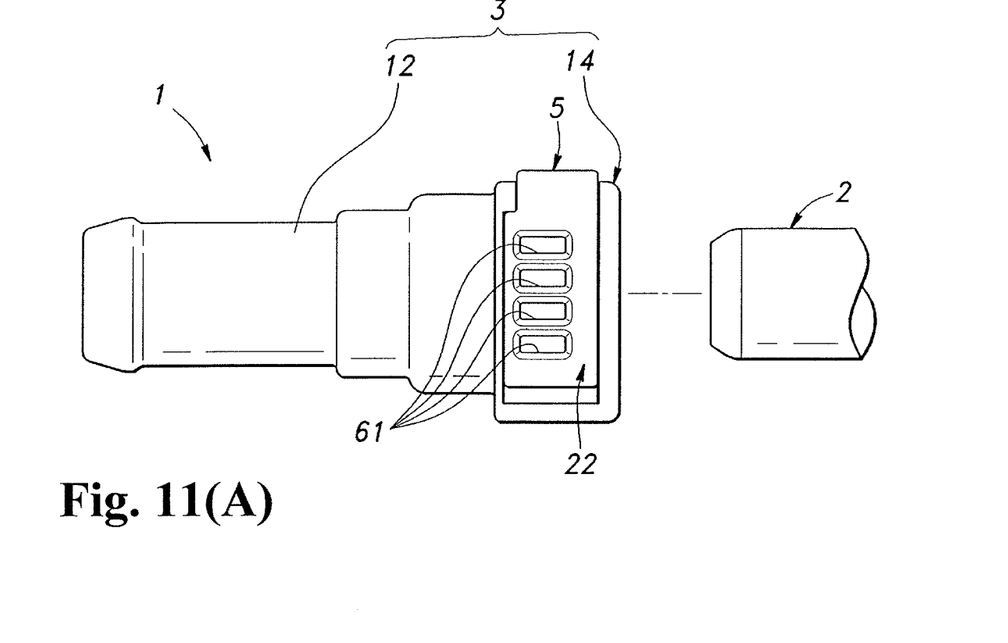
Figure 11B:
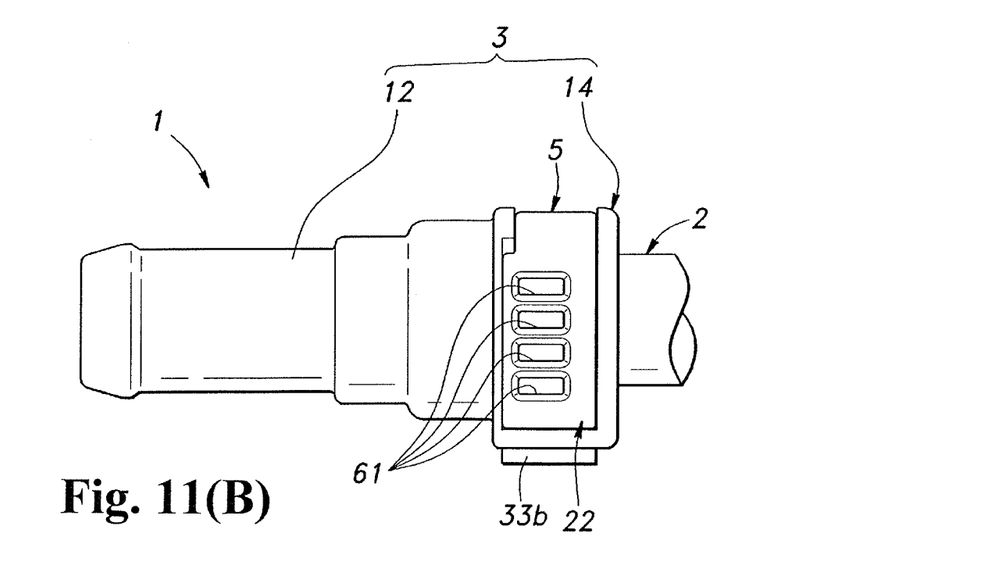

As shown in FIG. 9, the connector 1 in accordance with the second embodiment is different from the connector 1 in accordance with the first embodiment in the configuration of the locking member 5. In FIG. 9, lower ends 33b of the locking member 5 are provided below the stepped part 33a in the arms 33, 33, and the lower ends 33b further extend downward than the locking member 5 in FIG. 2. As shown in FIG. 10, a pair of protruding openings 95 is provided on the lower surface of the insertion part 14 of the housing 3 so as to correspond to the lower ends 33b of the arms 33, 33.

Thus, as in the first embodiment, when the locking member 5 is lowered at connection between the connector 1 and the pipe 2, as shown in FIG. 11, the lower end 33b of the arms 33, 33 protrude from the protruding openings 95 of the housing 3, respectively.

With such configuration in the second embodiment, the user can verify more reliably the connection state on the basis of the shielded state or the exposed state of the display pieces 74, 74 of the identifying member 6 and change of the protruded position of the locking member 5. In this case, in the unconnected state of the connector 1 in FIG. 11(A), a portion where the locking member 5 (more specifically, the top of the body part 32) protrudes (that is, the upper opening 21) is provided in one side (upper side) of the housing 3, while in the connection completed state of the connector 1 in FIG. 11(B), a portion where the locking member 5 (more specifically, the lower ends 33b of the legs 33,33) protrudes (that is, the protruding openings 95) is provided in the other side (lower side) of the housing 3. Therefore, the user can easily verify change of the protruded position of the locking member 5 by the sense of touching by a finger or the like.

Although the present invention has been described in detail based on the certain embodiments, the above-mentioned embodiments are merely exemplary and the present invention is not limited by these embodiments. For example, the counterpart as an object to be connected to the connector according to the present invention is not limited to the pipe 2 and may be variously changed. All of the constituents of the connector according to the present invention are not essential and can be appropriately selected at least so as not to deviate from the scope of the present invention.

DESCRIPTION OF REFERENCE SIGNS 1 connector
2 pipe (counterpart)
3 housing
4 insertion hole
5 locking member
6 identifying member
11 flange part
21 upper opening
22a gap
23 display opening (first display opening)

24 engaging claw
33 arm
41 elastic lock piece
42 pipe contact part
43 engaged part
61 display opening (second display opening)
74 display piece (connection completion display part)
81 contact surface

What is claimed is:

1. A connector for verifying a connection state between the connector and a counterpart, comprising:
   a housing including an insertion hole for inserting the counterpart, a housing wall, and a central axis;
   a locking member slidably attached to the housing and adapted to receive the counterpart inserted into the insertion hole to move transverse said housing central axis from an initial position to a locked position in which the counterpart is undetachably fixed to said locking member, said locking member having an arm; and
   an identifying member provided in the housing and having a connection completion display part having a different color from the locking member,
   wherein the housing includes a first display opening in said housing wall that exposes the connection completion display part, and
   the locking member includes a second display opening in said arm that overlaps the first display opening to expose the connection completion display part at the initial position, and does not overlap the first display opening to shield the connection completion display part at the locked position;
   wherein the housing further comprises an engaging claw, and the locking member comprises an elastic lock piece having a pipe contact part adapted to abut against the counterpart to move the locking member to the locked position, and an engaged part engaging to the engaging claw of the housing to restrict an upward movement of the locking member; and
   whereby said locking member shields said connection completion display part at the initial position, and exposes said connection completion display part at the locked position.

2. A connector for verifying a connected state between the connector and a counterpart, comprising:
   a housing including an insertion hole for inserting the counterpart, a housing wall, and a central axis;
   a locking member slidably attached to the housing and adapted to receive the counterpart inserted into the insertion hole to move transverse said housing central axis from an initial position to a locked position in which the counterpart is undetachably fixed to said locking member, said locking member having an arm; and
   an identifying member provided in the housing and having a connection completion display part for displaying completion of connection between the connector and the counterpart,
   wherein the housing includes a first display opening in said housing wall that exposes the connection completion display part, and
   the locking member includes a second display opening in said arm that does not overlap the first display opening to shield the connection completion display part at the initial position, and overlaps the first display opening to expose the connection completion display part at the locked position;
   wherein the housing further comprises an engaging claw, and the locking member comprises an elastic lock piece having a pipe contact part adapted to abut against the counterpart to move the locking member to the locked position, and an engaged part engaging to the engaging claw of the housing to restrict an upward movement of the locking member; and
   whereby said locking member shields said connection completion display part at the initial position, and exposes said connection completion display part at the locked position.

3. A connector according to claim 2, wherein the locking member protrudes more outwardly than an outer shape of the housing at the initial position, and is housed to be flush with or more inner than the outer shape of the housing at the locked position.

4. A connector according to claim 2, wherein the locking member protrudes more outwardly than an outer shape of the housing at the initial position, and an amount of protrusion changes relative to the locked position.

5. A connector according to claim 2, wherein the locking member protrudes from one portion of the housing at the initial position, and protrudes from a portion that is different from the one portion of the housing at the locked position.

6. A connector according to claim 2, wherein the locking member includes an engaged part engageable with the housing, and
   the engaged part is not engaged with the housing when the locking member is located at the initial position and is engaged with the housing when the locking member is located at the locked position.

7. A connector according to claim 6, wherein the housing includes an engaging part engaging the engaged part of the locking member, and
   when the locking member moves from the initial position to the locked position, the engaged part is moved from a disengaged position of one side of the engaging part to the other engaged position of the other side of the engaging part across the engaging part by an elastic deformation of the locking member.

* * * * *